United States Patent
Shimazu

(10) Patent No.: US 9,994,177 B2
(45) Date of Patent: Jun. 12, 2018

(54) VEHICLE OCCUPANT PROTECTION DEVICE AND VEHICLE OCCUPANT PROTECTION METHOD

(71) Applicant: TOYOTA JIDOSHA KABUSHIKI KAISHA, Toyota-shi (JP)

(72) Inventor: Katsuya Shimazu, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 64 days.

(21) Appl. No.: 15/158,209

(22) Filed: May 18, 2016

(65) Prior Publication Data

US 2016/0339860 A1 Nov. 24, 2016

(30) Foreign Application Priority Data

May 22, 2015 (JP) ................. 2015-104752

(51) Int. Cl.
*B60R 21/0134* (2006.01)
*B60R 21/0136* (2006.01)
*B60R 21/01* (2006.01)

(52) U.S. Cl.
CPC ...... *B60R 21/0134* (2013.01); *B60R 21/0136* (2013.01); *B60R 2021/01034* (2013.01); *B60R 2021/01211* (2013.01); *B60R 2021/01272* (2013.01)

(58) Field of Classification Search
CPC .................. B60R 21/0134; B60R 21/0136
See application file for complete search history.

(56) References Cited

U.S. PATENT DOCUMENTS

| | | | |
|---|---|---|---|
| 5,788,281 A | 8/1998 | Yanagi et al. | |
| 7,207,410 B2 * | 4/2007 | Song | B60R 19/483 180/274 |
| 2009/0099749 A1 * | 4/2009 | Hayasaka | B60R 21/0132 701/70 |
| 2010/0280719 A1 * | 11/2010 | Trinh | B60R 21/013 701/46 |
| 2012/0065843 A1 * | 3/2012 | Thomas | B60R 21/0136 701/45 |
| 2015/0084316 A1 * | 3/2015 | Okuhara | B60R 21/2338 280/729 |

FOREIGN PATENT DOCUMENTS

| | | | | |
|---|---|---|---|---|
| JP | 9-132113 | | 5/1997 | |
| JP | 2001-247009 | * | 9/2001 | ............. B60R 22/46 |
| JP | 2005-335586 | | 12/2005 | |
| JP | 2006-315446 A | | 11/2006 | |
| JP | 2008-74156 | | 4/2008 | |
| JP | 2011-168215 A | | 9/2011 | |
| JP | 2012-180055 A | | 9/2012 | |

* cited by examiner

*Primary Examiner* — Jess Whittington
(74) *Attorney, Agent, or Firm* — Oblon, McClelland, Maier & Neustadt, L.L.P.

(57) ABSTRACT

There is provided a vehicle occupant protection device, the device including (1) a rear detection section that detects an object approaching obliquely from a rear of an occupant's vehicle, (2) a signal output section that outputs an actuation signal, and (3) a seatbelt device that includes a mechanism to, in cases in which the object has been detected by the rear detection section, increase restraint force on an occupant by taking up webbing after being input with the actuation signal.

12 Claims, 9 Drawing Sheets

US 9,994,177 B2

VEHICLE OCCUPANT PROTECTION DEVICE AND VEHICLE OCCUPANT PROTECTION METHOD

CROSS-REFERENCE TO RELATED APPLICATION

This application claims priority under 35 USC 119 from Japanese Patent application No. 2015-104752 filed on May 22, 2015, the disclosure of which is incorporated by reference herein.

BACKGROUND

Technical Field

The present disclosure relates to a vehicle occupant protection device and a vehicle occupant protection method for protecting an occupant of a vehicle.

Related Art

Vehicle occupant protection devices have been proposed hitherto that detect collisions of an object with a vehicle, and protect an occupant.

For example, technology is known that regulates the tension of webbing to protect the occupant according to conditions between an occupant's vehicle and an object that is behind the occupant's vehicle (see, for example, Japanese Patent Application Laid-Open (JP-A) No. H09-132113). In this technology, detection is made by a sensor within a predetermined range behind the occupant's vehicle, and the webbing is taken up to impart belt tension in cases in which the object behind the occupant's vehicle is a vehicle following behind the occupant's vehicle, and the distance between the occupant's vehicle and the vehicle following behind is a predetermined inter-vehicle distance, or less.

However, due to the sensor detecting objects behind the occupant's vehicle only detecting those objects within a predetermined range behind the occupant's vehicle, it is sometimes difficult to detect objects behind the occupant's vehicle lying outside the predetermined range capable of being detected by the sensor. Namely, although a vehicle following behind the occupant's vehicle can be detected as an object behind the occupant's vehicle on a straight road, it is sometimes difficult to detect another vehicle with a weak following relationship as an object behind the occupant's vehicle. For example, in cases in which the traveling direction of the occupant's vehicle and the traveling direction of the other vehicle travelling behind the occupant's vehicle are different from each other, such as on a curved road, there are sometimes cases in which the other vehicle is outside the predetermined range behind the occupant's vehicle and it is difficult to detect the other vehicle as an object behind the occupant's vehicle. Insufficient consideration is therefore given to protecting an occupant from a collision of an object such as another vehicle approaching from outside the detection range of the sensor, specifically, another vehicle approaching obliquely from the rear of the occupant's vehicle.

In consideration of the above circumstances, the present disclosure provides a vehicle occupant protection device and a vehicle occupant protection method capable of improving occupant protection performance with respect to an oblique collision from the rear of a vehicle, using a simple configuration.

SUMMARY

A first aspect of the present disclosure is a vehicle occupant protection device including a rear detection section that detects an object approaching obliquely from a rear of an occupant's vehicle, a signal output section that outputs an actuation signal, and a seatbelt device that includes a mechanism to, in cases in which the object has been detected by the rear detection section, increase restraint force on an occupant by taking up webbing after being input with the actuation signal.

In the first aspect, the rear detection section detects an object approaching obliquely from the rear of the occupant's vehicle. The signal output section outputs an actuation signal to the seatbelt device in cases in which an object has been detected by the rear detection section. Taking up the webbing and increasing restraint force on the occupant using the webbing in cases in which another vehicle has approached obliquely from the rear of the occupant's vehicle in this manner enables occupant protection performance to be improved using a simple configuration.

A vehicle occupant protection device of a second aspect is the vehicle occupant protection device of the first aspect, wherein an object for detection by the rear detection section is an object approaching obliquely from the rear for which a collision with the occupant's vehicle is unavoidable.

In the second aspect, the webbing is taken up in cases in which a collision between the object such as another vehicle and the occupant's vehicle is unavoidable, thereby enabling occupant protection performance to be further improved prior to the object and the occupant's vehicle colliding.

A vehicle occupant protection device of a third aspect is the vehicle occupant protection device of the first aspect or the second aspect, further including a physical quantity detection section that detects a physical quantity relating to an oblique collision from the rear and outputs a detection value, an airbag device that includes an airbag deployed during an oblique collision from the rear to protect an occupant, and a controller that controls to actuate the airbag device in cases in which the detection value detected by the physical quantity detection section has exceeded a threshold value. The controller employs a first threshold value as the threshold value in cases in which the object is not detected by the rear detection section, and employs a second threshold value that is smaller than the first threshold value as the threshold value in cases in which the object has been detected by the rear detection section.

In the third aspect, the physical quantity detection section detects a physical quantity relating to an oblique collision from the rear and outputs a detection value. The controller controls to actuate the airbag device in cases in which the detection value detected by the physical quantity detection section has exceeded the threshold value. The controller employs the first threshold value as the threshold value in cases in which the object is not detected by the rear detection section, and employs the second threshold value that is smaller than the first threshold value as the threshold value in cases in which the object has been detected by the rear detection section. This enables a collision with the occupant's vehicle by another vehicle obliquely from the rear to be easily detected, and occupant protection performance during an oblique collision from the rear is improved, since the airbag device that protects the occupant during an oblique collision from the rear is actuated.

A vehicle occupant protection device of a fourth aspect is the vehicle occupant protection device of the third aspect, wherein the airbag device includes plural airbag devices, the vehicle occupant protection device further includes a secondary collision forecasting section that, after the occupant's vehicle and the object have collided, forecasts a secondary collision with another object that is different from the object. The controller controls to actuate at least one airbag device out of the plural airbag devices in cases in which the detection value has exceeded the threshold value. The controller controls to protect the occupant from a forecasted secondary collision and to actuate an airbag device that has not yet been actuated in cases in which a secondary collision has been forecast by the secondary collision forecasting section.

In the fourth aspect, a secondary collision with another object that is different from the object is forecast, and the airbag device that has not yet been actuated is actuated to protect the occupant from the secondary collision, thereby enabling the occupant to be protected, even in cases of a secondary collision after the other vehicle has collided with the occupant's vehicle obliquely from the rear.

A vehicle occupant protection device of a fifth aspect is the vehicle occupant protection device of the third aspect, wherein the airbag device includes plural airbag devices. In cases in which the controller controls to actuate at least one airbag device from out of the plural airbag devices, at the same time, or after a predetermined duration has elapsed, the controller also controls to actuate at least one airbag device that has not yet been actuated, from out of the plural airbag devices.

In the fifth aspect, in cases in which at least one airbag device is actuated, at the same time, or after a predetermined duration has elapsed, at least one airbag device is actuated that has not yet been actuated, from out of the plural airbag devices. Thus, plural airbag devices are actuated at the same time, or after a predetermined duration during a collision, enabling the occupant to be protected by the plural airbag devices.

A vehicle occupant protection device of a sixth aspect is the vehicle occupant protection device of the fourth aspect or the fifth aspect, wherein the plural airbag devices includes at least one airbag device selected from the group consisting of a curtain shield airbag device, a near side airbag device, and a far side airbag device.

A vehicle occupant protection device of a seventh aspect is the vehicle occupant protection device of any one of the third aspect to the sixth aspect, wherein the physical quantity detection section includes at least one sensor selected from the group consisting of a G sensor and a yaw rate sensor.

A vehicle occupant protection method of an eighth aspect includes detecting an object approaching obliquely from a rear of an occupant's vehicle, and increasing restraint force on the occupant in cases in which the object has been detected by taking up webbing of a seatbelt device that includes a mechanism to increase restraint force on the occupant by webbing take-up.

A non-transitory computer readable medium of a ninth aspect stores a program that causes a computer to execute a process for vehicle occupant protection, the process including detecting an object approaching obliquely from a rear of an occupant's vehicle, and increasing restraint force on the occupant in cases in which the object has been detected by taking up webbing of a seatbelt device that includes a mechanism to increase restraint force on the occupant by webbing take-up.

As explained above, the present disclosure enables vehicle occupant protection performance to be improved using a simple configuration.

BRIEF DESCRIPTION OF THE DRAWINGS

Exemplary embodiments of the present disclosure will be described in detail based on the following figures, wherein.

DETAILED DESCRIPTION

Detailed explanation follows regarding examples of exemplary embodiments of the present disclosure, with reference to the drawings.

First Exemplary Embodiment

Figure 1:
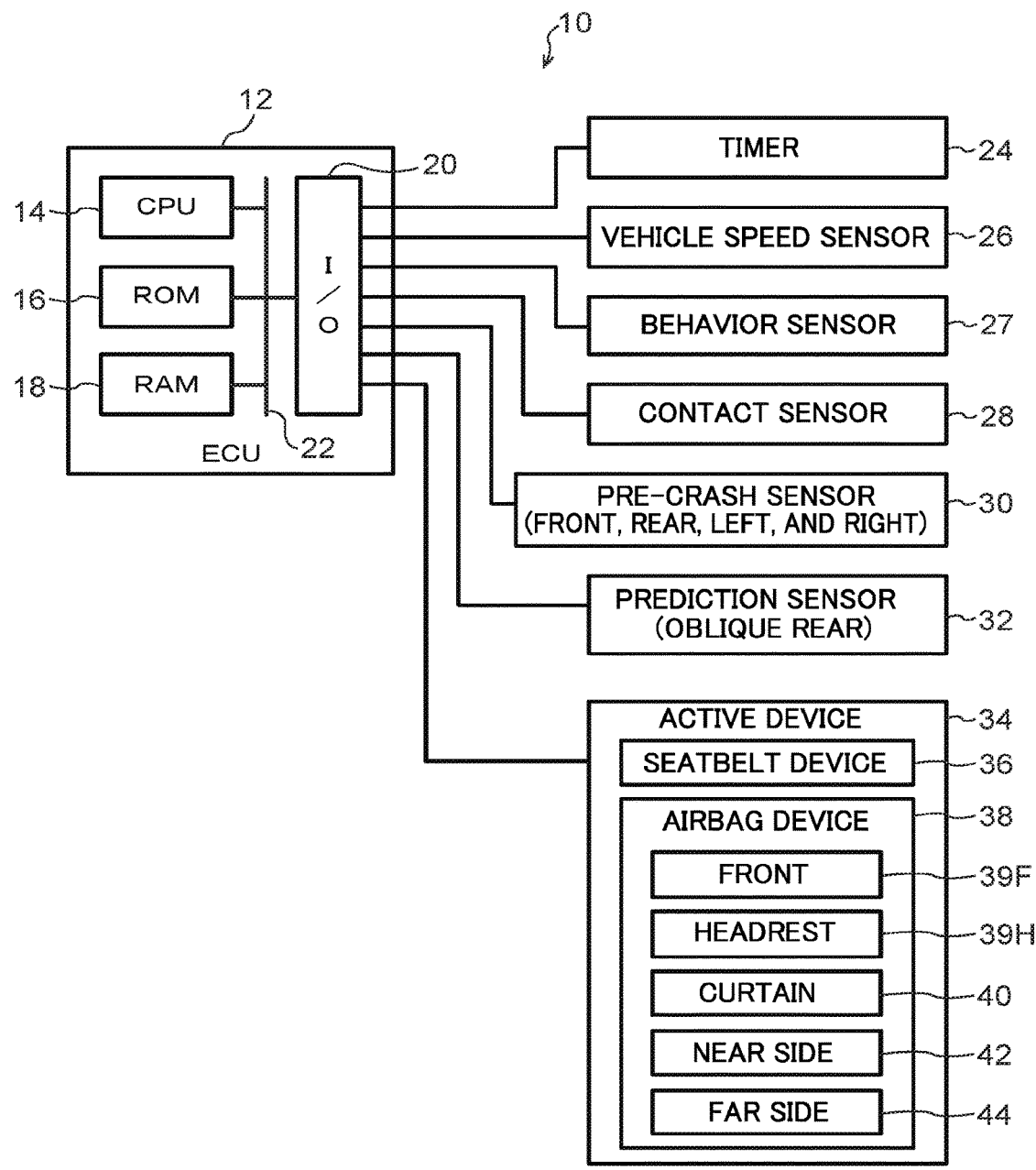
FIG. 1 is a block diagram illustrating an example of a configuration of a vehicle occupant protection device according to a first exemplary embodiment.

FIG. 1 illustrates an example of a configuration of a vehicle occupant protection device according to an exemplary embodiment. A vehicle occupant protection device 10 includes an ECU 12 that performs various controls for protecting an occupant from a collision of an object.

The ECU 12 is configured by a computer including a CPU 14, ROM 16, RAM 18, and an I/O 20. The CPU 14, the ROM 16, the RAM 18, and the I/O 20 are connected together by a bus 22 so as to be capable of exchanging various commands and data.

A program for protecting the occupant of the occupant's vehicle, a threshold value for detecting a collision, and the like are stored in the ROM 16. Control to protect the occupant of the occupant's vehicle is performed by the CPU 14 executing the program stored in the ROM 16. Note that the RAM 18 is used as cache memory and so on when executing programs.

A timer 24 for measuring time, a vehicle speed sensor 26, a behavior sensor 27, a contact sensor 28, a pre-crash sensor 30, a prediction sensor 32, and active devices 34 are connected to the I/O 20. In the present exemplary embodiment, the active devices 34 include a seatbelt device 36 and an airbag device 38 for protecting the occupant of the occupant's vehicle. The airbag device 38 includes a front airbag device 39F and a headrest airbag device 39H. The airbag device 38 also includes a curtain shield airbag device (CSA) 40, a near side airbag device (SAB) 42, and a far side airbag device 44. The vehicle speed sensor 26, the contact sensor 28, the pre-crash sensor 30, and the prediction sensor 32 are detectors for detecting a state of the vehicle.

The ECU 12 controls so as to actuate the active device 34 based on the respective detection values of the vehicle speed sensor 26, the behavior sensor 27, the contact sensor 28, the pre-crash sensor 30, and the prediction sensor 32.

Figure 2:
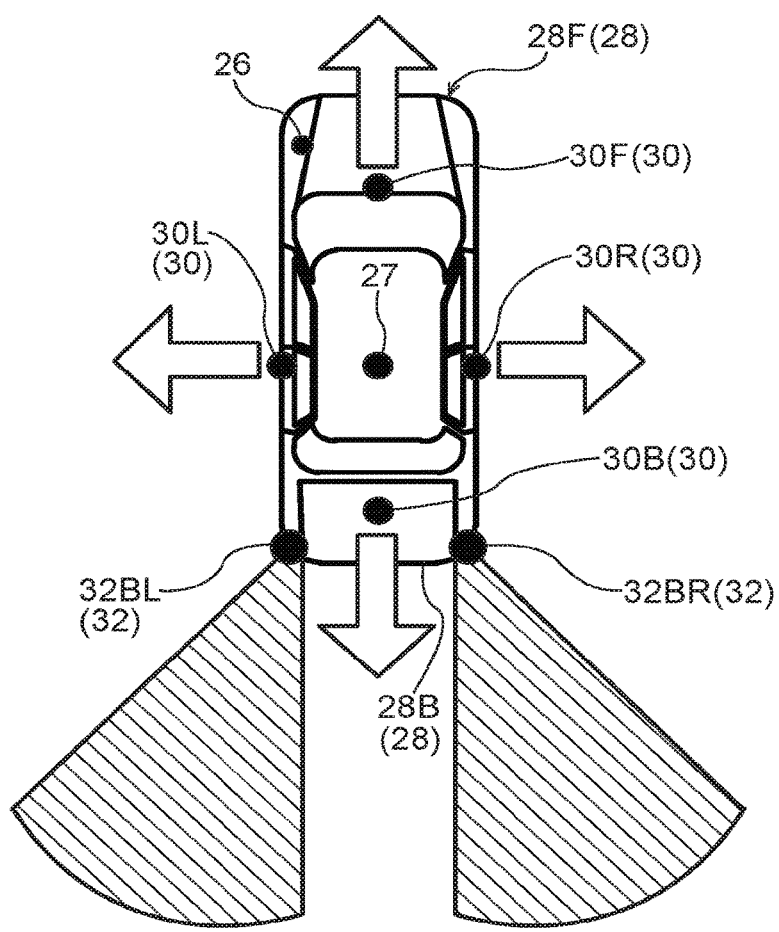
FIG. 2 is an illustrative diagram illustrating an example of placement of detectors according to the first exemplary embodiment.

FIG. 2 illustrates an example of placement of detectors for detecting the state of the vehicle according to the present exemplary embodiment. The vehicle speed sensor 26 is a detector for detecting the speed of the vehicle (vehicle speed). Note that in FIG. 2, the arrow FR indicates toward the front of the vehicle, and the arrow RH indicates toward the right of the vehicle.

The behavior sensor 27 is a sensor that detects vehicle behavior, and is also a sensor that detects a physical quantity relating to a collision, particularly a side-on collision, and outputs a detection value. Examples of the behavior sensor 27 include a G sensor and a yaw rate sensor. An example of the behavior sensor 27 is a G sensor capable of detecting front-rear G and left-right G, provided at the center of the vehicle illustrated in FIG. 2.

The contact sensor 28 is a detector provided on a vehicle bumper to detect a physical quantity relating to pressure generated in a collision of an object, for example. In the contact sensor 28, a pressure chamber, a pressure tube, or the like, is provided at a predetermined location on the vehicle bumper, and pressure inside the pressure chamber or pressure tube is detected. A contact sensor 28F provided at a front vehicle bumper, and a contact sensor 28B provided at a rear vehicle bumper are illustrated in FIG. 2 as an example.

The pre-crash sensor 30 is a non-contact detector that functions as a preventative sensor to detect any objects in the vehicle surroundings that have a possibility of colliding with the vehicle. The pre-crash sensor 30 detects objects in the respective front, rear, left, and right directions of the vehicle, serving as the vehicle surroundings. Examples of the pre-crash sensor 30 include an onboard camera that captures images of the respective front, rear, left, and right directions to detect objects, and onboard radar that scans the respective front, rear, left, and right directions of the vehicle to detect objects. FIG. 2 illustrates an example provided with a pre-crash sensor 30F that detects in front, a pre-crash sensor 30B that detects at the rear, a pre-crash sensor 30R that detects at the right, and a pre-crash sensor 30L that detects at the left, of the vehicle.

The prediction sensor 32 is a detector provided at the vehicle rear to detect the approach of any objects obliquely from the rear of the vehicle. Examples of the prediction sensor 32 include an onboard camera that captures images at the oblique rear of the occupant's vehicle in both left and right directions to detect objects. Another example of the prediction sensor 32 is an onboard radar that scans the oblique rear of the vehicle in both left and right directions to detect objects. FIG. 2 illustrates an example provided with a prediction sensor 32BR that detects at the oblique rear right, and a prediction sensor 32BL that detects at oblique rear left, of the vehicle.

Note that the above description is an example of a case in which the pre-crash sensor 30 and the prediction sensor 32 are separately provided, the pre-crash sensor 30 detects objects in the respective front, rear, left, and right directions of the vehicle, and the prediction sensor 32 detects objects at the oblique rear of the vehicle in both left and right directions. In cases in which the pre-crash sensor 30 is capable of detecting an object from the oblique rear left and right of the vehicle, the pre-crash sensor 30 may double as the prediction sensor 32. In cases in which the pre-crash sensor 30 is capable of detecting an object from the oblique rear left and right of the vehicle, the prediction sensor 32 may be configured by the part that detects an object from the oblique rear left and right of the vehicle.

Figure 3:
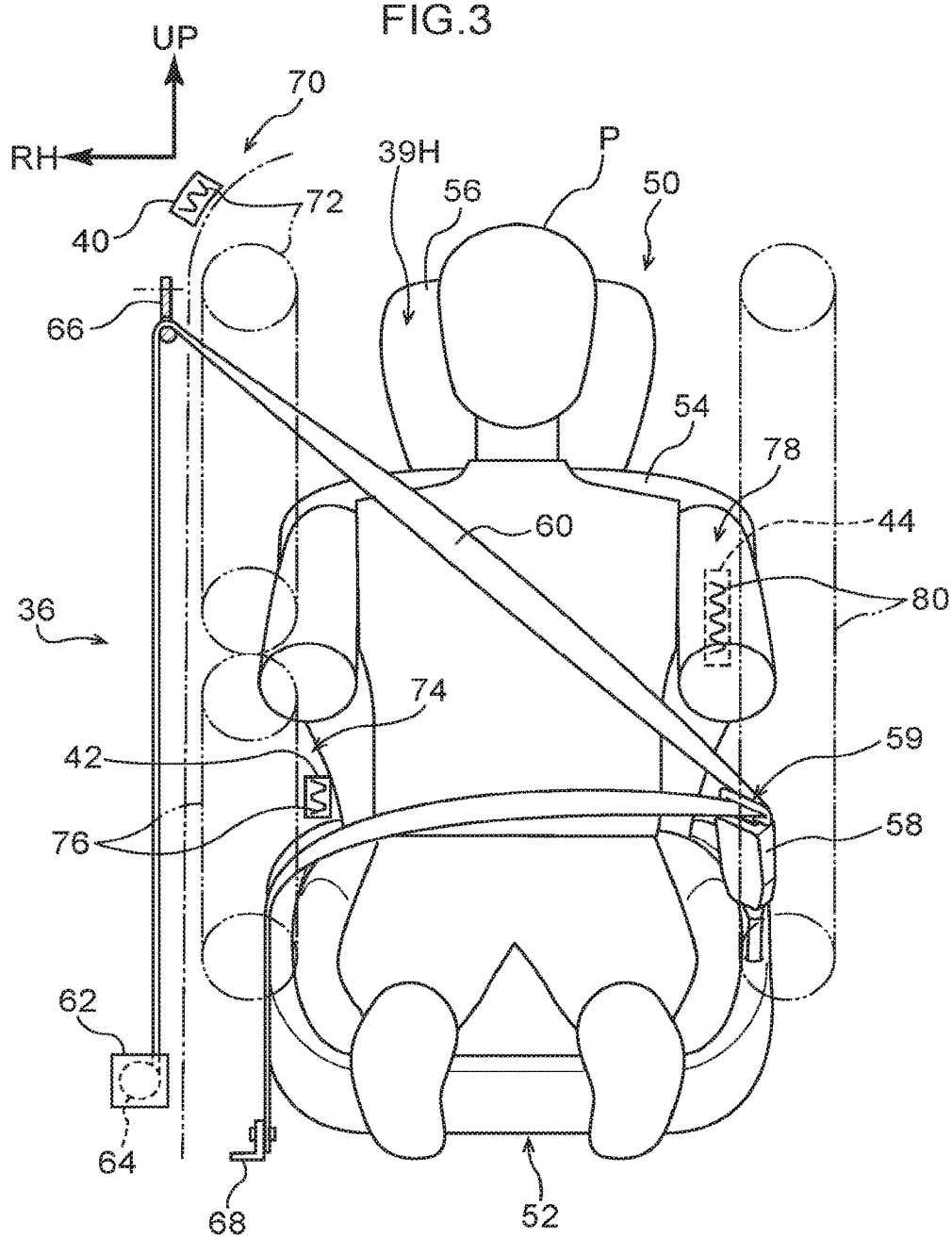
FIG. 3 is an illustrative diagram illustrating an example of an active device according to the first exemplary embodiment.

FIG. 3 illustrates an example of the active device 34 according to the present exemplary embodiment. The active device 34 is a device for actuating a protection device for protecting the occupant of the occupant's vehicle in cases in which an object has collided with the occupant's vehicle.

Note that in FIG. 3, the arrow UP indicates toward the vehicle seat upper side, and the arrow RH indicates toward the vehicle seat right side (toward the right of the occupant's vehicle). In the below explanation, explanation is regarding an exemplary embodiment relating to an active device 34 for protecting an occupant seated in a vehicle seat provided as a vehicle right side seat; however, the active device 34 may be applied to protect an occupant seated in a vehicle left side vehicle seat. In such cases, the active device 34 is disposed with left-right symmetry to when applied to the vehicle right side seat. The active device 34 may also be applied to protect an occupant seated in a rear seat of the vehicle.

As illustrated in FIG. 3, a vehicle seat 50 is configured including a seat cushion 52 on which an occupant P sits, and a seatback 54 that supports the back of the occupant P. A headrest 56 that supports the head of the occupant P is provided at an upper end portion of the seatback 54.

A buckle 58, configuring the seatbelt device (PSB) 36 included in the active device 34, is attached to the seat cushion 52. A tongue 59, through which webbing (a seatbelt) 60 is inserted, is configured capable of engaging and disengaging with the buckle 58.

The webbing 60 is an elongated strap shaped belt for restraining the occupant P in the vehicle seat 50. One end portion of the webbing 60 is wound onto a spool 64 configuring a retractor 62 provided at a lower portion further toward the vehicle right side than the vehicle seat 50. The webbing 60 extends from the retractor 62 toward the vehicle seat upper side, and is hooked onto a shoulder anchor 66 disposed further toward the vehicle seat upper side than the shoulders of the occupant P. The webbing 60 extends obliquely toward the vehicle seat lower left side from the shoulder anchor 66 toward the buckle 58. Another end portion of the webbing 60 is inserted through the tongue 59 engaged with the buckle 58, folded back toward the vehicle seat right side, and fixed to an anchor 68 disposed obliquely below the seat cushion 52.

The retractor 62 is disposed at the vehicle seat right side, and includes the spool 64 that the one end portion of the webbing 60 is wrapped onto. The spool 64 is provided inside the retractor 62, and is disposed so as to be capable of rotating in a take-up direction and a pull-out direction of the webbing 60. A motor, not illustrated in the drawings, is connected to the spool 64, and the motor is driven to rotate the spool 64 in the take-up direction and to take up the webbing 60. In a non-loaded state in which no voltage is applied to the motor, the webbing 60 is pulled out to rotate the spool 64 in the pull-out direction and pull out the webbing 60.

A lock mechanism, not illustrated in the drawings, which locks rotation of the spool 64 in the pull-out direction, is provided at the retractor 62. The lock mechanism has a conventionally known structure, and is capable of locking the rotation of the spool 64 when the vehicle brakes suddenly, for example. Note that the lock mechanism has a structure that does not lock rotation of the spool 64 in the take-up direction, and configuration is such that a locked state of the spool 64 by the lock mechanism is released by rotating the spool 64 in the take-up direction.

A pre-tensioner, not illustrated in the drawings, is also provided at the retractor 62. The pre-tensioner has a conventionally known structure, and configuration is such that the spool 64 is forcefully rotated in the take-up direction of the webbing 60 by actuating the pre-tensioner.

As illustrated in FIG. 3, the curtain shield airbag device (CSA) 40 included in the active devices 34 is provided running along a roof side rail 70 of the vehicle. The curtain shield airbag device 40 includes a curtain airbag bag body 72, and the curtain airbag bag body 72 is stowed folded along the length direction of the roof side rail 70 during normal use.

An inflator, not illustrated in the drawings, for supplying gas for deployment to the curtain airbag bag body 72, is provided in close proximity to the curtain airbag bag body 72, and the non-illustrated inflator is configured so as to be actuated by an ignition signal from the ECU 12.

By actuating the non-illustrated inflator, the curtain shield airbag device 40 deploys the curtain airbag bag body 72, which was stowed in the roof side rail 70 in a folded state, in a curtain shape toward the vehicle lower side along a vehicle body side section, and mainly protects the head of the occupant P seated in the vehicle seat 50.

As illustrated in FIG. 3, the near side airbag device 42 included in the active devices 34 is provided at a vehicle width direction outside side section of the vehicle seat 50, such as inside a seatback pad 74 at a door-side side section of the seatback 54. The near side airbag device 42 includes a near side airbag bag body 76, and the near side airbag bag body 76 is folded and stowed during normal use.

An inflator, not illustrated in the drawings, for supplying gas for deployment to the near side airbag bag body 76, is provided in the close proximity to the near side airbag bag body 76, and the non-illustrated inflator is configured so as to be actuated by an ignition signal from the ECU 12.

The near side airbag device 42 actuates the non-illustrated inflator in a side-on collision, for example, deploys the near side airbag bag body 76 that was stowed in a folded state toward a vehicle door side, and mainly protects the chest and lumbar region of the occupant P seated in the vehicle seat 50.

As is also illustrated in FIG. 3, the far side airbag device 44 included in the active devices 34 is provided at a side section 78 at the vehicle width direction inside of the seatback 54 of the vehicle seat 50. The far side airbag device 44 includes a far side airbag bag body 80, and the far side airbag bag body 80 is folded and stowed during normal use.

An inflator, not illustrated in the drawings, for supplying gas for deployment to the far side airbag bag body 80, is provided in the close proximity to the far side airbag bag body 80, and the non-illustrated inflator is configured so as to be actuated by an ignition signal from the ECU 12.

The far side airbag device 44 actuates the non-illustrated inflator in a side-on collision, for example, and deploys the far side airbag bag body 80 that was stowed in a folded state toward the vehicle width direction inside of the occupant P. The far side airbag bag body 80 is formed with a size capable of restraining the head, shoulders, chest, abdominal region, and lumbar region of the occupant P, and deployment of the far side airbag bag body 80 protects the head, shoulders, chest, abdominal region, and lumbar region of the occupant P seated in the vehicle seat 50.

As illustrated in FIG. 3, the active devices 34 include the front airbag device 39F including a front airbag bag body that inflates in front of the occupant, and the headrest airbag device 39H that protects the back of the head and around the neck of the occupant by inflating a headrest airbag bag body stowed in the headrest 56.

The possibility another vehicle collides with the occupant's vehicle can be detected by the pre-crash sensor 30. Namely, the pre-crash sensor 30 detects objects in the respective front, rear, left, and right directions of the vehicle. However, the possibility of another vehicle traveling behind the occupant's vehicle colliding with the occupant's vehicle is not limited to a rear-end collision in which another vehicle following the occupant's vehicle collides with the occupant's vehicle. A case in which another vehicle approaching obliquely from the rear collides with the occupant's vehicle, for example, is also conceivable. Detection at the rear of the occupant's vehicle by the pre-crash sensor 30B is insufficient to detect another vehicle approaching obliquely from the rear, and sometimes a collision occurs without being able to detect the possibility of another vehicle approaching obliquely from the rear colliding with the occupant's vehicle.

Therefore, in the present exemplary embodiment, the ECU 12 forecasts the possibility of another vehicle approaching obliquely from the rear and colliding with the occupant's vehicle, and actuates the active device 34 in order to protect the occupant. Namely, by using the prediction sensors 32BR, 32BL to detect another vehicle approaching the occupant's vehicle obliquely from the rear, the possibility of the other vehicle approaching obliquely from the rear colliding with the occupant's vehicle is forecast. In cases in which it has been forecast that there is a possibility of the other vehicle approaching obliquely from the rear colliding with the occupant's vehicle, the active device 34 is shifted to an actuation preparation state. Forecasting, as to whether a collision of the other vehicle approaching obliquely from the rear of the occupant's vehicle is unavoidable, is made based on a signal from the prediction sensor 32. An example in which it is forecasted that a collision of another vehicle with the occupant's vehicle obliquely from the rear is unavoidable is when a distance between the occupant's vehicle and the other vehicle at the oblique rear is a predetermined distance, or below. In addition to being at a predetermined distance or below as described above, cases in which a relative speed between the occupant's vehicle and another vehicle exceeds a predetermined relative speed, at which there is a high possibility of a collision between the occupant's vehicle and the other vehicle, may be added as a condition under which a collision is forecast to be unavoidable. The active device 34 is actuated when it has been forecast that a collision with the occupant's vehicle by the other vehicle obliquely from the rear is unavoidable. In the present exemplary embodiment, the seatbelt device 36 is actuated as an example of the active device 34 when it has been forecast that a collision is unavoidable. Namely, by actuating the seatbelt device 36 such that spool 64 is forcefully rotated in the take-up direction of the webbing 60 using the motor, slack of the webbing 60 against the occupant P is eliminated, and the restraint force on the occupant P is increased. Occupant protection performance is thereby improved.

In the present exemplary embodiment, vehicle behavior is detected by the G sensor, this being an example of the behavior sensor 27 (see FIG. 2). The behavior sensor 27 is electrically connected to the ECU 12, and outputs a signal to the ECU 12 corresponding to changes in vehicle behavior, such as vehicle orientation, or vehicle movement and direction. In cases in which a physical quantity indicating vehicle behavior, identified by the signal that corresponds to changes in vehicle behavior from the behavior sensor 27, has exceeded a predetermined threshold value, the ECU 12 is able to detect a collision of an object with the occupant's vehicle.

When an object has collided with the occupant's vehicle, the physical quantity indicating vehicle behavior (the output value of the behavior sensor 27, such as the G sensor) sometimes differs depending on the collision direction of the object. For example, a relatively large physical quantity is observed in cases in which another vehicle following behind has collided from the rear with the occupant's vehicle, and in cases in which another vehicle has collided from the side with the occupant's vehicle. The output value of the behavior sensor 27, in cases in which another vehicle following behind has collided from the rear with the occupants vehicle, and in cases in which another vehicle has collided from the side with the occupant's vehicle, is derived in advance, and a first threshold value th1, serving as a threshold value for detecting a collision with an object, is set according to this derived value. This enables a collision of another vehicle with the occupant's vehicle to be detected in cases in which the output value of the behavior sensor 27 has exceeded the first threshold value th1.

In cases in which another vehicle following behind has collided with the occupant's vehicle obliquely from the rear, the physical quantity is expected to be smaller than in cases in which another vehicle has collided from the rear, or has collided from the side.

Figure 4:
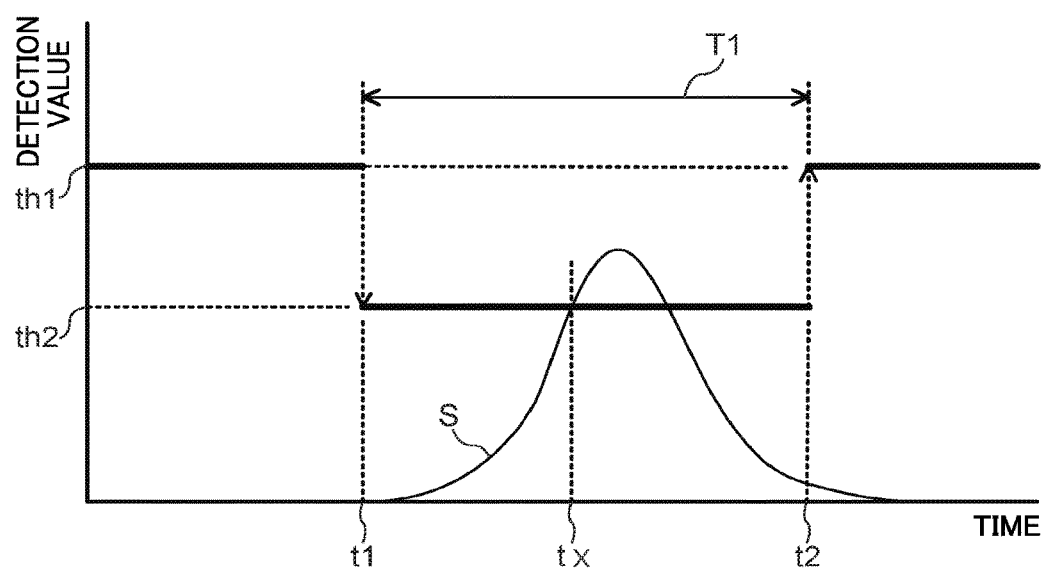
FIG. 4 is a graph illustrating an example of characteristics illustrating behavior of an occupant's vehicle according to the first exemplary embodiment.

An example of output characteristics of the behavior sensor 27, serving as a physical quantity indicating behavior of the occupant's vehicle in cases in which another vehicle following behind has collided with the occupant's vehicle obliquely from the rear, is illustrated as a characteristic curve S in FIG. 4. In cases in which another vehicle has collided with the occupant's vehicle obliquely from the rear, an output value S of the behavior sensor 27 does not reach the predetermined first threshold value th1.

In the present exemplary embodiment, the output value of the behavior sensor 27 in cases in which another vehicle following behind has collided with the occupant's vehicle obliquely from the rear is derived in advance, and a second threshold value th2 that is smaller than the first threshold value th1 is set as a threshold for detecting a collision with an object. This enables a collision of another vehicle following behind, obliquely from the rear, with the occupant's vehicle to be detected in cases in which the output value S of the behavior sensor 27 has exceeded the second threshold value th2. However, if the second threshold value th2 were normally set as a threshold value for detecting a collision with an object, collisions other than those with other vehicles colliding obliquely from the rear would sometimes be detected. Thus, in the present exemplary embodiment, oblique collisions from the rear are predicted by the prediction sensor 32. Namely, an object at the oblique rear that has a possibility of colliding with the occupant's vehicle obliquely from the rear is detected for by the prediction sensor 32 (time t1). In cases in which an object has been detected at the oblique rear with a possibility of colliding with the occupant's vehicle obliquely from the rear (at the timing of the time t1), the threshold value for assessing a collision of an object with the vehicle is changed from the first threshold value th1, normally used for detection, to the second threshold value th2, used to detect oblique collisions from the rear. This enables detection that another vehicle following behind has collided with the occupant's vehicle obliquely from the rear (time tx).

The ECU 12 can maintain the second threshold value th2 for assessing a collision during a predetermined duration T1 (from t1 to t2). The ECU 12 changes the threshold value for assessing a collision of an object with the vehicle from the first threshold value th1 to the second threshold value th2 during the predetermined duration T1. Changing the threshold value only over a predetermined duration is performed in order, after having identified another vehicle that has a possibility of colliding with the occupant's vehicle obliquely from the rear, to suppress unnecessary collision detection by the output value of the behavior sensor 27 in a collision with the vehicle bumper.

Whether or not to maintain the second threshold value th2 for assessing a collision may be determined based on the distance between the occupant's vehicle and the other vehicle, instead of using the predetermined duration T1. Namely, in cases in which the distance between the occupant's vehicle and the other vehicle detected by the prediction sensor 32 is a separation of a distance exceeding a predetermined distance, the threshold value for assessing a collision of an object with the vehicle is changed from the first threshold value th1 to the smaller second threshold value th2.

Note that an example has been illustrated in which the behavior sensor 27 is provided at the vehicle center; however, there is no limitation to only providing the behavior sensor 27 at the vehicle center, and plural behavior sensors 27 may be provided. For example, one or more behavior sensors 27 may be respectively provided at the front, rear, left, and right of the vehicle.

In the present exemplary embodiment, the prediction sensor 32 is an example of a rear detection section of the present disclosure, and the behavior sensor 27 is an example of a physical quantity detection section of the present disclosure. The ECU 12 is an example of a signal output section and of a controller of the present disclosure. The seatbelt device 36 is an example of a seatbelt device of the present disclosure, the retractor 62 and the spool 64 are an example of a mechanism for increasing restraint force on the occupant by taking up the webbing. The airbag device 38 is an example of an airbag device of the present disclosure.

Figure 5:
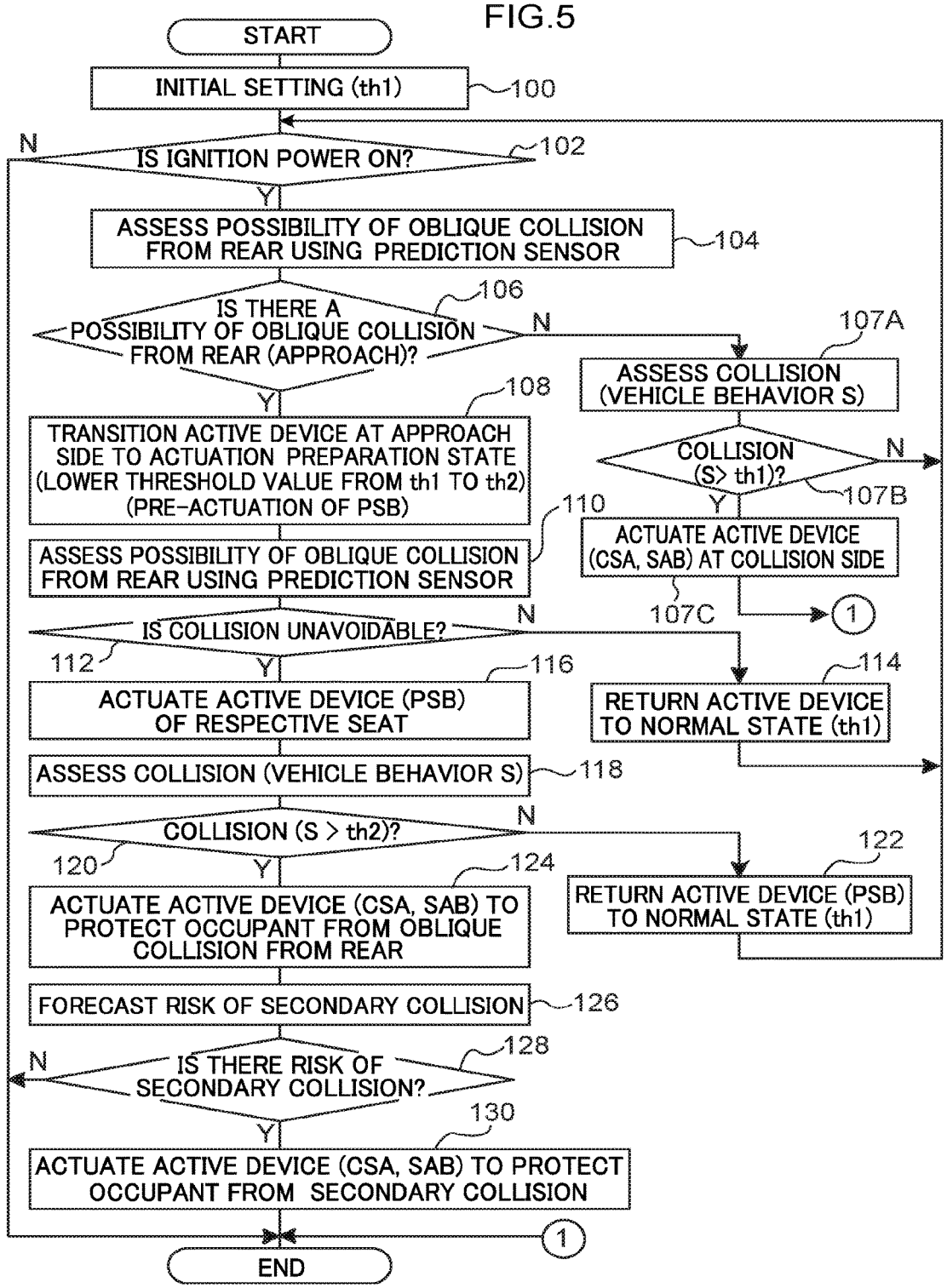
FIG. 5 is a flowchart illustrating an example of a flow of processing executed by a vehicle occupant protection device according to the first exemplary embodiment.

Explanation follows regarding an example of processing in the vehicle occupant protection device 10 according to the present exemplary embodiment. FIG. 5 illustrates an example of a flow of processing executed by the ECU 12 in the vehicle occupant protection device 10 according to the present exemplary embodiment. Note that in the present exemplary embodiment, a program that implements the example of the flow of processing illustrated in FIG. 5 and is pre-stored in the ROM 16 is executed by the ECU 12. The processing in FIG. 5 is started when an ignition switch, not illustrated in the drawings, has been switched ON.

First, when the ignition switch is switched ON, initial setting is executed at step 100. At the next step 102, determination is made as to whether or not the ignition switch is switched ON. Processing transitions to step 104 in cases in which affirmative determination was made, and the present processing routine is ended is cases in which negative determination was made. In the initial setting at step 100, the first threshold value th1 for a normal state is set as a threshold value TH for assessing a collision of an object with the vehicle. Namely, the first threshold value th1 is read from the ROM 16 and is set as the threshold value TH for assessing a collision of an object according to the output value of the behavior sensor 27.

At step 104, detection is made for an object at the oblique rear of the occupant's vehicle by the prediction sensor 32, and the possibility that the object at the oblique rear of the occupant's vehicle collides with the occupant's vehicle is assessed based on the detection result. Namely, the ECU 12 detects objects at the oblique rear of the occupant's vehicle from the sensor output value of the prediction sensor 32, such as an onboard camera or onboard radar. Explanation follows below regarding a case in which another vehicle has been detected as the object. In cases in which the sensor output value of the prediction sensor 32 is a sensor output value indicating a state in which the other vehicle is approaching the occupant's vehicle, the ECU 12 assesses that there is a possibility of the other vehicle at the oblique rear of the occupant's vehicle colliding with the occupant's vehicle. Note that in the assessment of step 104, assessment may be made that there is a possibility of the other vehicle at the oblique rear colliding with the occupant's vehicle in cases in which the other vehicle has been detected at the oblique rear of the occupant's vehicle, without being limited to cases in which a sensor output value indicates a state in which the other vehicle is approaching the occupant's vehicle.

At the next step 106, determination is made, for the assessment of step 104, as to whether or not there is a possibility of the other vehicle at the oblique rear of the occupant's vehicle colliding with the occupant's vehicle. Processing transitions to step 107A in cases in which negative determination was made at step 106, and processing transitions to step 108 in cases in which affirmative determination was made at step 106.

At step 107A, an output value of the behavior sensor 27 for assessing a collision is acquired. At the next step 107B, determination is made as to whether or not a collision has occurred. Note that in order to simplify the explanation, explanation follows regarding a case in which collision assessment is performed using the output value S of the behavior sensor 27, and the active device 34 at the collision side is actuated. Namely, at step 107B, determination is made as to whether or not the other vehicle has collided with the occupant's vehicle by distinguishing whether or not the output value of the behavior sensor 27 has exceeded the threshold value TH, this being whether or not the first threshold value th1 has been exceeded in this case. Processing returns to step 102 in cases in which negative determination was made at step 107B and processing transitions to step 107C in cases in which affirmative determination was made at step 107B. At step 107C, the active device 34 at the collision side is actuated, and the present processing routine is ended. The curtain shield airbag device 40 provided at left and right side sections of the occupant's vehicle, and the near side airbag device 42 and the far side airbag device 44 provided in the respective seat are employed as examples of the active devices 34 actuated at step 107C. Namely, the ECU 12 outputs an actuation signal to the active devices 34 at the collision side. In cases in which the other vehicle has collided from the right side of the occupant's vehicle, for example, the collision side is the right side, and the inflators of the curtain shield airbag device 40 and the near side airbag device 42 at the right side are actuated in the vehicle seat 50 (see FIG. 3) provided as the vehicle right side seat. The occupant seated in the vehicle seat 50 provided as the vehicle right side seat is protected during a collision by actuating the active device 34 at the collision side in this manner.

In cases in which there is a possibility of the other vehicle colliding with the occupant's vehicle obliquely from the rear, at step 108, the active device 34 at the approach side is transitioned to the actuation preparation state so that the active device 34 quickly responds in a collision of the other vehicle with the occupant's vehicle at the oblique rear. In the present exemplary embodiment, a state in which the threshold value TH for assessing a collision with another vehicle and actuating the active device 34 is set lower is adopted as an example of the actuation preparation state. Namely, the second threshold value th2 for detecting another vehicle at the oblique rear of the occupant's vehicle is set as the threshold value TH for assessing a collision with another vehicle. For this setting, the second threshold value th2 is read from the ROM 16 and set as the threshold value TH for assessing a collision with another vehicle. The threshold value TH for assessing a collision with another vehicle is thereby changed from the first threshold value th1 to the smaller second threshold value th2.

Note that at step 108, processing may be executed in which the occupant P is alerted by sound using a warning noise or a screen indicating alert information when transitioning to the actuation preparatory state. Moreover, at step 108, the seatbelt device 36 of the respective seat may be actuated as a precaution such that the spool 64 is rotated in the take-up direction of the webbing 60 using the motor, and a weak tension is imparted to the occupant P. Alternatively, only the seatbelt device 36 of the occupant P seated in the driver seat may be actuated in order to notify the occupant P seat in the driver seat.

At the next step 110, a collision of the other vehicle (object) with the occupant's vehicle obliquely from the rear is forecast based on the sensor output value of the prediction sensor 32, and assessment is made as to whether a collision of the other vehicle with the occupant's vehicle is unavoidable. Namely, a collision is assessed to be unavoidable in cases in which there is a high possibility of the other vehicle continuing to approach, and colliding with, the occupant's vehicle. In this assessment, a collision may be assessed to be unavoidable in cases in which the distance between the occupant's vehicle and the other vehicle is a predetermined distance, or below. Specifically, the ECU 12 detects the other vehicle at the oblique rear of the occupant's vehicle from the sensor output value of the prediction sensor 32. The ECU 12 then assesses that a collision is unavoidable in cases in which the sensor output value of the prediction sensor 32 indicates that the other vehicle continues to approach, and the distance between the occupant's vehicle and the other vehicle is the predetermined distance, or below. Note that in the assessment at step 110, assessment that a collision is unavoidable may be made in cases in which the distance between the occupant's vehicle and the other vehicle is the predetermined distance or below, without being limited to cases in which the sensor output value indicates a state in which the object continues to approach the occupant's vehicle. The relative speed between the occupant's vehicle and the other vehicle may also be employed as a condition to assess that a collision is unavoidable.

At the next step 112, for the assessment at step 110, determination is made as to whether or not a collision between the other vehicle at the oblique rear and the occupant's vehicle is unavoidable. Processing transitions to step 116 in cases in which affirmative determination was made at step 112 based on the assessment that a collision is unavoidable at step 110. In cases in which negative determination was made at step 112, at step 114, the active device 34 that was transitioned to the actuation preparatory state is returned to a normal state, and processing returns to step 102. At step 114, the setting of the threshold value TH for assessing a collision with another vehicle is changed from the second threshold value th2 to the first threshold value th1. Note that in the processing of steps 110 and 112, processing may be returned to step 110 by negative determination at step 112, and assessment as to whether a collision is unavoidable executed, during the predetermined duration T1 (see FIG. 4) with reference to the timer 24.

At step 116, the active device 34 is actuated. In the present exemplary embodiment, the seatbelt device 36 provided in the respective seat of the occupant's vehicle is employed as an example of the active device 34 actuated at step 116. Thus, at step 116, the seatbelt device 36 of the respective seat is actuated such that the spool 64 is forcefully rotated in the take-up direction of the webbing 60 using the motor, and the occupant P is restrained by a strong tension. The restraint force on the occupant P thereby increases, and occupant protection performance is improved.

At the next step 118, a collision between the occupant's vehicle and the other vehicle obliquely from the rear is assessed based on the output value of the behavior sensor 27. Namely, the ECU 12 acquires information indicating vehicle behavior by reading the output value S of the behavior sensor 27.

Note that at step 118, an assessment is also executed regarding the collision side in a collision of the other vehicle with the occupant's vehicle obliquely from the rear. Namely, the collision side is assessed from the sensor output value of the prediction sensor 32 using the assessment that a collision is unavoidable at step 110. Specifically, an assessment is made as to whether the collision side is the oblique rear right or the oblique rear left of the occupant's vehicle by assessing which out of the prediction sensor 32BR or the prediction sensor 32BL had the sensor output value dominantly employed in the assessment of an unavoidable collision. Note that in the assessment of the collision side, it is sufficient as long as the collision side of the other vehicle colliding with the occupant's vehicle can be distinguished, and there is no limitation to employing the sensor output value of the prediction sensor 32. An output value from the G sensor or the like by which direction can be distinguished, the sensor output value of the contact sensor 28, or the sensor output value of the pre-crash sensor 30 may be employed in the assessment of the collision side.

Next, at step 120, determination is made as to whether or not a collision has occurred based on the assessment result at step 118. Namely, at step 120, determination is made as to whether or not the other vehicle has collided with the occupant's vehicle obliquely from the rear by distinguishing whether or not the output value S of the behavior sensor 27 has exceeded the threshold value TH, namely, whether or not the second threshold value th2 used in a collision at the oblique rear has been exceeded. In cases in which negative determination was made at step 120, at step 122, the actuated active device 34 is returned to the normal state, and processing returns to step 102. At step 122, the state in which the webbing 60 is forcefully taken up in the seatbelt device 36 of the respective seat to increase the restraint force on the occupant P is released. The threshold value TH is also returned from the second threshold value th2 to the first threshold value th1 at step 122. Note that in the processing of steps 118 and 120, processing may be returned to the processing of step 118 by negative determination at step 120, and collision assessment executed, during the predetermined duration T1 (see FIG. 4) with reference to the timer 24.

In cases in which affirmative determination was made at step 120, an actuation instruction is issued at step 124 to the active device 34 at the collision side. In the present exemplary embodiment, the curtain shield airbag device 40, the near side airbag device 42, and the far side airbag device 44 provided in the respective seat of the vehicle are employed as examples of the active devices 34 actuated at step 124. Namely, the ECU 12 outputs an actuation signal indicating an instruction to actuate to the active devices 34 at the collision side. In cases in which the other vehicle has collided obliquely from the rear right of the occupant's vehicle, for example, the collision side is the right side, and the inflators of the curtain shield airbag device 40 and the near side airbag device 42 are actuated in the vehicle seat 50 (see FIG. 3) provided as the vehicle right side seat. The occupant seated in the vehicle seat 50 provided as the vehicle right side seat is protected during a collision by actuating the active device 34 at the collision side in this manner.

Note that although the output value S of the behavior sensor 27 was used to determine whether or not a collision has occurred envisaging linear vehicle movement in the above description, determination of a collision is not limited to using only linear vehicle movement. For example, determination may be made that a collision has occurred in cases in which the occupant's vehicle has rotated exceeding a predetermined rotation angle. Namely, in cases in which the other vehicle has collided obliquely from the rear of the occupant's vehicle, the occupant's vehicle may enter a rotating state due to a difference between the traveling direction of the occupant's vehicle and the collision direction. Namely, a collision may be determined to have occurred in cases in which rotation of the occupant's vehicle is detected using the output value S of the behavior sensor 27, such as a G sensor or a yaw rate sensor, and the occupant's vehicle has entered a rotating state.

Next, at step 126, forecasting processing is executed to forecast the risk of a secondary collision. The forecasting processing is processing to forecast a secondary collision of the occupant's vehicle with an object, such as a vehicle ahead or a guard rail, present in the direction in which the occupant's vehicle is moving after an oblique collision from the rear. The forecasting processing is similar to conventionally known collision forecasting processing, and can be executed using the pre-crash sensor 30, for example. Forecasting processing (forecasting algorithms), in which an object is detected in the vehicle surroundings and the risk of the detected object approaching and colliding with the occupant's vehicle is assessed, is an example of a case in which the pre-crash sensor 30 is employed. The secondary collision side of the secondary collision is also assessed in the forecasting processing.

In the present exemplary embodiment, processing executed at step 126 to forecast the risk of a secondary collision is an example of forecasting of a secondary collision in a secondary collision forecasting section of the present disclosure.

At the next step 128, determination is made as to whether or not there is a risk of a secondary collision based on the assessment result at step 126, and in cases in which negative determination was made, the present processing is simply ended. In cases in which affirmative determination was made at step 128, an actuation instruction is issued to the active device 34 at the opposite-to-collision side at step 130, and the present processing routine is ended. Namely, in addition to the active device 34 that was actuated after the assessment of a collision, an active device 34 which has not yet been actuated is actuated. At step 130, in cases in which the secondary collision side assessed at step 126 is the opposite side to the collision side at which the other vehicle has collided with the occupant's vehicle obliquely from the rear, the secondary collision side is set as the opposite-to-collision side, and an actuation instruction for the active device 34 at the opposite-to-collision side is also executed. For example, in cases in which the other vehicle has collided obliquely from the rear right of the occupant's vehicle and the collision side is the right side, when there is a risk of a secondary collision with an object at the left side of the occupant's vehicle, the vehicle seat 50 (see FIG. 3) provided as the vehicle right side seat is set as the opposite-to-collision side, and the inflator of the far side airbag device 44 thereof is actuated. The occupant P can be protected during a secondary collision by actuating the active device 34 at the opposite-to-collision side in this manner.

In the present exemplary embodiment, an example has been explained in which the risk of a secondary collision is forecast, and the active device 34 at the opposite-to-collision side is actuated when there is a high risk of a secondary collision; however, there is no limitation thereto. For example, the active device 34 at the opposite-to-collision side and another active device 34 that has not been actuated may be actuated at the same time as the actuation of the active device 34 at the collision side, without forecasting the risk of a secondary collision. Alternatively, the active device 34 at the opposite-to-collision side and another active device 34 that has not yet been actuated may be actuated after a specific duration following actuation of the active device 34 at the collision side.

Figure 6:
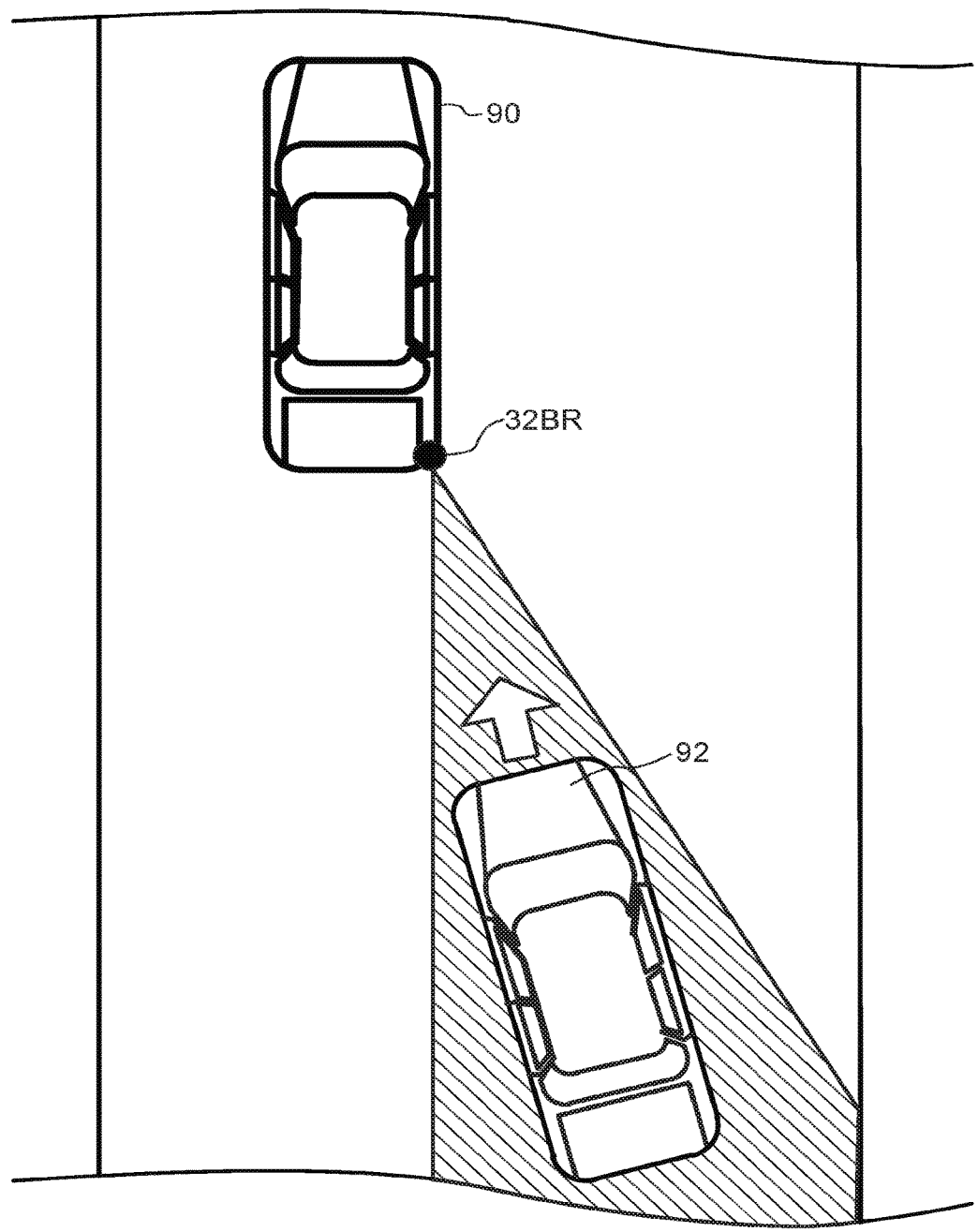
FIG. 6 is an illustrative diagram illustrating an example of a traveling state of another vehicle with respect to an occupant's vehicle according to the first exemplary embodiment.

FIG. 6 illustrates a case in which another vehicle is approaching the occupant's vehicle obliquely from the rear right when the occupant's vehicle is traveling straight ahead, as an example of a traveling state of the other vehicle with respect to the occupant's vehicle. As illustrated in FIG. 6, a traveling state of the other vehicle in which the other vehicle 92 approaches the occupant's vehicle 90 obliquely from the rear right is detected by the prediction sensor 32BR. After the approach of the other vehicle 92 obliquely from the rear right is detected, the webbing 60 is forcefully taken up by the seatbelt device 36 of the respective seat in the occupant's vehicle 90, restraint force on the occupant P is increased, and occupant protection performance is improved. In cases in which a collision with the other vehicle 92 has occurred, from out of the curtain shield airbag device 40, the near side airbag device 42, and the far side airbag device 44, the active device 34 at the collision side is actuated, and the occupant P seated in the vehicle seat 50 is protected. The active device 34 at the opposite-to-collision side is also actuated when there is a high risk of a secondary collision, so that the occupant P is also protected in a secondary collision.

Figure 7:
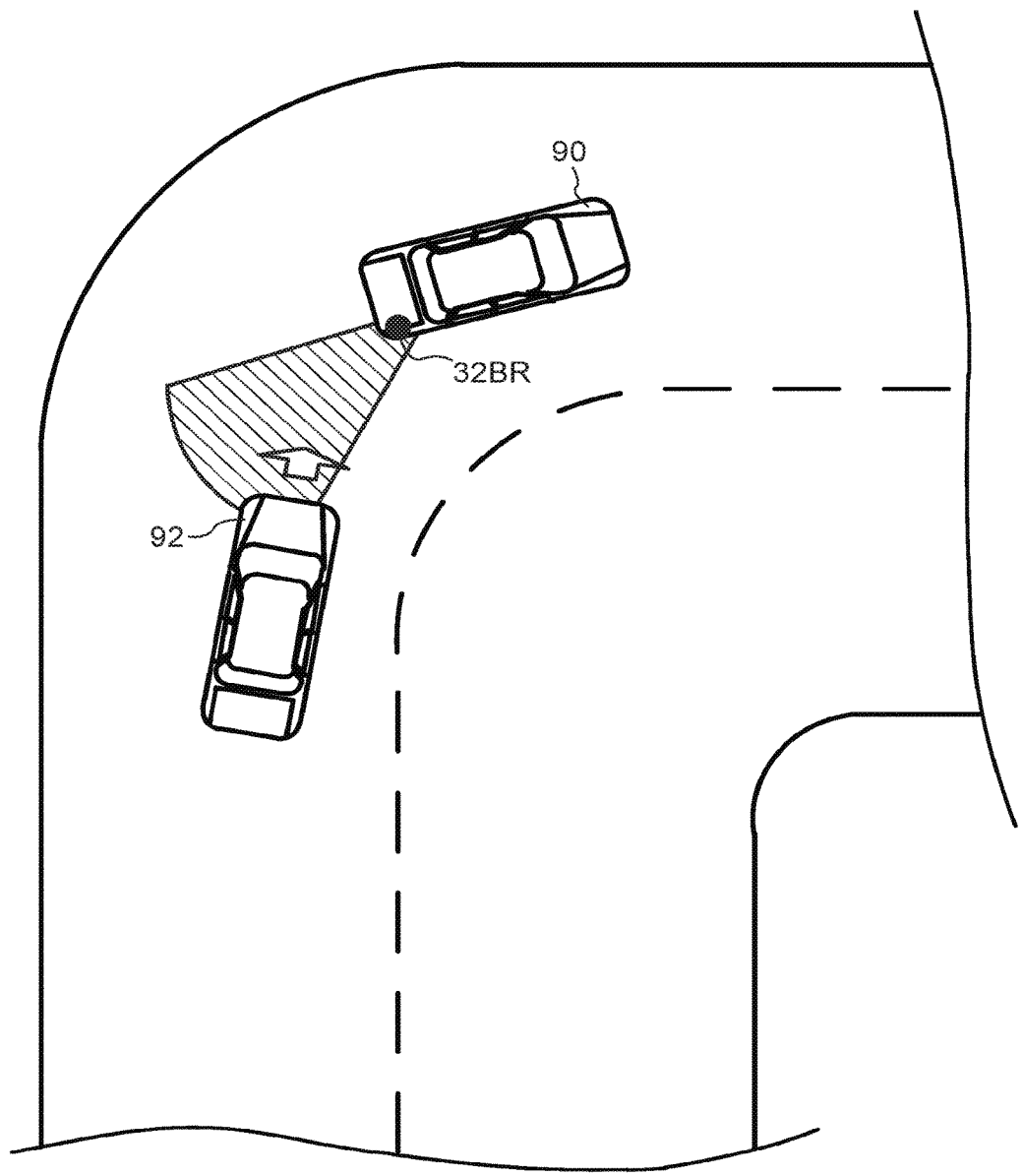
FIG. 7 is an illustrative diagram illustrating a different example of a traveling state of another vehicle with respect to an occupant's vehicle according to the first exemplary embodiment.

FIG. 7 illustrates a case in which the occupant's vehicle has entered a curved road when the other vehicle is following behind, as another example of a traveling state of the other vehicle with respect to the occupant's vehicle. As illustrated in FIG. 7, when the occupant's vehicle 90 is traveling along the curved road, the other vehicle 92 traveling behind enters a traveling state approaching the occupant's vehicle 90 obliquely from the rear right. Namely, the traveling direction of the occupant's vehicle 90 and the traveling direction of the other vehicle 92 are different when the occupant's vehicle 90 is traveling along the curved road. Thus, even in cases in which the other vehicle 92 is following behind the occupant's vehicle 90, the other vehicle 92 sometimes enters a traveling state approaching the occupant's vehicle 90 obliquely from the rear right, and the traveling state in which the other vehicle 92 approaches the occupant's vehicle 90 sometimes cannot be sufficiently detected. However, in the present exemplary embodiment, the approach of the other vehicle 92 obliquely from the rear is detected by the prediction sensor 32BR, and the webbing 60 is forcefully taken up in the seatbelt device 36 of the respective seat of the occupant's vehicle 90. Thus, the restraint force on the occupant P increases, and the occupant protection performance is improved. In cases in which a collision with the other vehicle 92 has occurred, the active device 34 at the collision side is actuated, enabling the occupant P to be protected, and the active device 34 at the opposite-to-collision side is also actuated in cases in which there is a high risk of a secondary collision, enabling the occupant P to also be protected during a secondary collision.

As explained above, in the present exemplary embodiment, the webbing 60 is forcefully taken up in the seatbelt device 36 after another vehicle approaching the occupant's vehicle obliquely from the rear has been detected. Taking up the webbing 60 in this manner enables any slack of the webbing 60 with respect to the occupant P to be eliminated, and the restraint force on the occupant P to be increased. This enables occupant protection performance to be improved compared to cases in which the webbing 60 is in a slack state. Taking up the webbing 60 to increase the restraint force on the occupant P can also notify the occupant P that another vehicle is approaching.

In the present exemplary embodiment, in cases in which it has been detected that another vehicle is approaching the occupant's vehicle obliquely from the rear, the threshold value for detecting a collision between the occupant's vehicle and the other vehicle is changed from the first threshold value th1 for a normal state to the smaller second threshold value th2 used to detect oblique collisions from the rear. This enables a collision between the occupant's vehicle and the other vehicle (object) to be assessed, even in cases in which the physical quantity indicating vehicle behavior is smaller, such as in an oblique collision from the rear.

In the present exemplary embodiment, change is made from the first threshold value to the smaller second threshold value when the distance between vehicles is within a predetermined distance, or only during a predetermined duration. This enables a collision in a normal state to be detected and also enables an oblique collision from the rear to be detected, enabling collision detection performance to be improved. Moreover, an oblique collision from the rear can be assessed using a simple configuration in which the threshold value for assessing a collision of an object is only changed over a predetermined duration. The threshold value TH is returned from the second threshold value th2 to the first threshold value th1 when the distance between vehicles has exceeded the predetermined distance or after the predetermined duration has elapsed, thereby enabling unnecessary actuation of the active device 34 to be prevented.

In the present exemplary embodiment, changing the threshold value set for use in a normal state to a smaller threshold value according to a physical quantity indicating vehicle behavior enables a collision in which another vehicle collides with the occupant's vehicle obliquely from the rear to be detected, thereby enabling a conventionally known collision detection device to double as a device for detecting an oblique collision from the rear.

Second Exemplary Embodiment

Explanation follows regarding a second exemplary embodiment. The second exemplary embodiment is an example of a case in which the occupant is protected from an oblique collision from the rear using the contact sensor 28. Since the second exemplary embodiment is similarly configured to the first exemplary embodiment, the same portions are appended with the same reference numerals, and detailed explanation thereof is omitted.

In each contact sensor 28F, 28B, which are examples of the contact sensor 28 functioning as a detector for detecting the vehicle state, a pressure tube or the like is provided at a predetermined position on the respective vehicle bumper, and the pressure inside the pressure tube or the like is detected (see FIG. 2). In such cases, the contact sensor 28 is configured by connecting the pressure tube to pressure sensors provided at both vehicle width direction ends. Namely, the contact sensor 28 is configured including a pressure tube formed in an elongated shape, and pressure sensors that output signals according to a pressure change in the pressure tube. The pressure sensors provided at both vehicle width direction ends of the pressure tube are electrically connected to the ECU 12, and signals according to the pressure change in the pressure tube due to the pressure tube deforming are output from the pressure sensors to the ECU 12.

This enables the ECU 12 to detect a collision of an object with the occupant's vehicle in cases in which the deformation amount of the vehicle bumper identified by the signals from the pressure sensors has exceeded a predetermined threshold value.

The deformation amount of the vehicle bumper when an object has collided with the vehicle bumper sometimes differs depending on the collision direction of the object. For example, a relatively large amount of deformation of the vehicle bumper is observed when another vehicle following behind has collided with the vehicle bumper. An effective mass, computed using the deformation amount in cases in which another vehicle following behind has collided from the rear with the vehicle bumper, is derived in advance, and a third threshold value th3 is set as a threshold value for detecting a collision with an object. This enables a rear-end collision with the other vehicle following behind to be detected in cases in which the effective mass computed using the deformation amount of the vehicle bumper has exceeded the third threshold value th3.

On the other hand, when another vehicle following behind has collided with the occupant's vehicle obliquely from the rear, the collision is with a portion of the vehicle bumper, and a deformation amount (used to compute effective mass) is expected to be smaller than the deformation amount (effective mass) when another vehicle following behind has collided from the rear.

Figure 8:
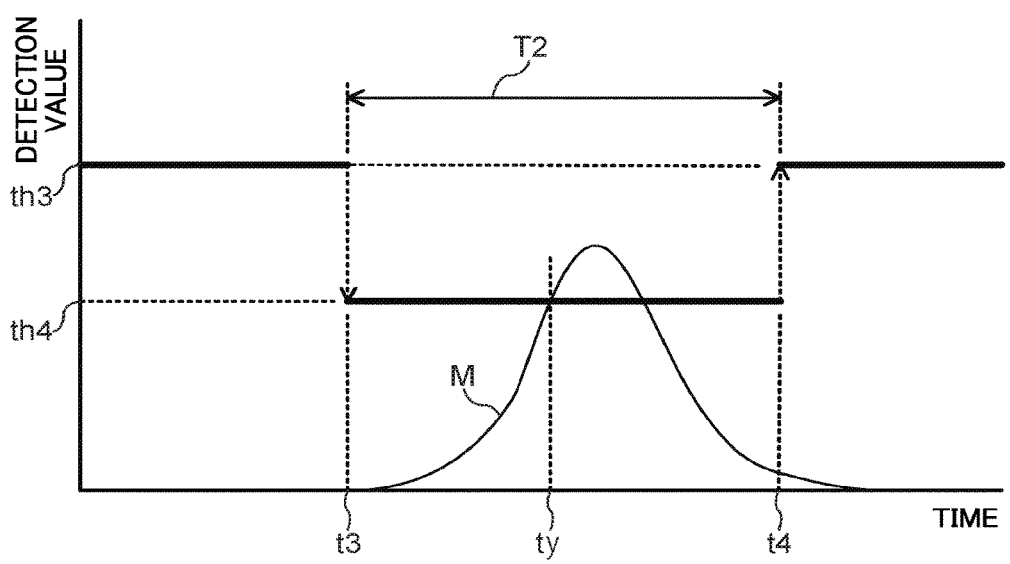
FIG. 8 is a graph illustrating an example of characteristics of effective mass of an object that has collided with a vehicle according to a second exemplary embodiment.

FIG. 8 illustrates an example of characteristics of an effective mass of an object, in cases in which another vehicle following behind has collided with the occupant's vehicle obliquely from the rear, as a characteristic curve M. In cases in which the other vehicle has collided with the occupant's vehicle obliquely from the rear, the deformation amount of the vehicle bumper (effective mass M) does not reach the predetermined third threshold value th3.

In the present exemplary embodiment, the effective mass in cases in which the other vehicle following behind has collided with the occupant's vehicle obliquely from the rear is derived in advance, and a fourth threshold value th4 that is smaller than the third threshold value th3 is set as the threshold value for detecting a collision with the object. This enables an oblique collision from the rear of the other vehicle following behind with the occupant's vehicle to be detected in cases in which the other vehicle is approaching the occupant's vehicle obliquely from the rear, and the effective mass M has exceeded the fourth threshold value th4. Namely, if the fourth threshold value th4 were normally set as a threshold value for detecting a collision with an object, collisions other than those with another vehicle colliding obliquely from the rear would sometimes be detected, and so prediction results for collisions obliquely from the rear by the prediction sensor 32 are employed. Specifically, an object at the oblique rear that has a possibility of colliding with the occupant's vehicle obliquely from the rear is detected by the prediction sensor 32 (time t3). In cases in which an object at the oblique rear that has a possibility of colliding with the occupant's vehicle obliquely from the rear has been detected (at the timing of the time t3), the threshold value for assessing a collision of an object with the vehicle is changed from the third threshold value th3, normally used for detection, to the fourth threshold value th4, used to detect oblique collisions from the rear. This enables detection that another vehicle following behind has collided with the occupant's vehicle obliquely from the rear (time ty).

The ECU 12 can maintain the fourth threshold value th4 for assessing a collision during a predetermined duration T2 (from t3 to t4). The ECU 12 changes the threshold value for assessing a collision of an object with the vehicle from the third threshold value th3 to the fourth threshold value th4 during the predetermined duration T2. Changing the threshold value only over the predetermined duration is in order to suppress unnecessary collision detection due to deformation amounts (effective masses) that do not reach those of a collision with the vehicle bumper, after having identified another vehicle that has a possibility of colliding with the occupant's vehicle obliquely from the rear.

Whether or not to maintain the fourth threshold value th4 for assessing a collision may be determined based on the distance between the occupant's vehicle and the other vehicle, instead of using the predetermined duration T2. Namely, in cases in which the distance between the occupant's vehicle and the other vehicle detected by the prediction sensor 32 is a separation exceeding a predetermined distance, the threshold value for assessing a collision of an object with the vehicle is changed from the fourth threshold value th4 to the third threshold value th3.

Note that although an example has been explained in which the pressure sensors serving as the contact sensor 28 are provided at both ends of the pressure tube, there is no limitation to providing pressure sensors at both ends of the pressure tube. For example, a pressure sensor may be provided at one of either end portion of a pressure tube, may be provided at an intermediate portion of a pressure tube, or may be provided at a combination of three or more of these locations. Plural pressure tubes and contact sensors 28 configured by the pressure tubes may be disposed in the vertical direction of the vehicle bumper.

In the present exemplary embodiment, the contact sensor 28 is an example of a deformation detection section of the present disclosure, and the front airbag device 39F and the headrest airbag device 39H are examples of a device of the present disclosure.

Figure 9:
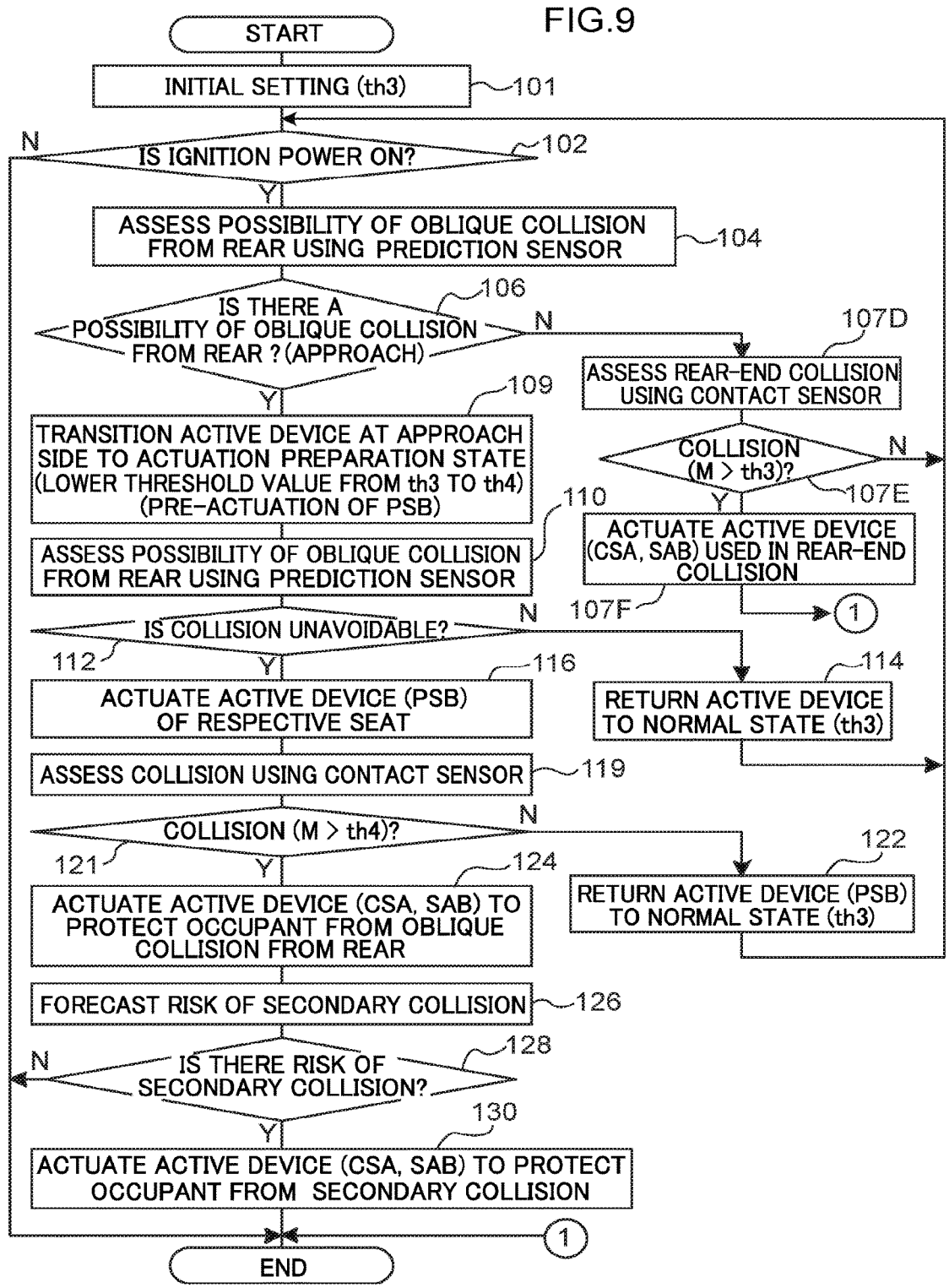
FIG. 9 is a flowchart illustrating an example of a flow of processing executed by a vehicle occupant protection device according to the second exemplary embodiment.

Explanation follows regarding an example of processing in the vehicle occupant protection device 10 according to the present exemplary embodiment. FIG. 9 illustrates an example of a flow of processing executed by the ECU 12 in the vehicle occupant protection device 10 according to the present exemplary embodiment. Note that in the present exemplary embodiment, a program that implements the example of the flow of processing illustrated in FIG. 9 and is pre-stored in the ROM 16 is executed by the ECU 12. The processing in FIG. 9 is started when an ignition switch, not illustrated in the drawings, has been switched ON.

First, initial setting is executed at step 101, and at the next step 102, a determination is made as to whether or not the ignition switch is switched ON. In the initial setting at step 101, the third threshold value th3 for a normal state is set as a threshold value TH of a deformation amount (effective mass) for assessing a collision of an object. Namely, the third threshold value th3 is read from the ROM 16 and is set as the threshold value TH for assessing a collision of an object according to the effective mass computed using the deformation amount of the vehicle bumper.

At step 104, the possibility of a collision of another vehicle approaching obliquely from the rear with the occupant's vehicle is assessed by the prediction sensor 32. At step 106, determination is made as to whether or not there is a possibility of the other vehicle at the oblique rear of the occupant's vehicle colliding with the occupant's vehicle.

In cases in which negative determination was made at step 106, at step 107D, a collision between the occupant's vehicle and the other vehicle from the rear is assessed based on the sensor output value of the contact sensor 28. Namely, the effective mass of the other vehicle, serving as the object, is detected at step 107D. The effective mass is detected based on the detection result of the contact sensor 28 and the detection result of the vehicle speed sensor 26. Specifically, the ECU 12 detects the deformation amount of the vehicle bumper and detects the physical quantity relating to pressure on the vehicle bumper by reading the output value of the contact sensor 28. Next, the ECU 12 computes an impulse by integrating the physical quantity relating to pressure detected by the contact sensor 28 over time, divides the computed impulse (N·s) by the vehicle speed (km/h) detected by the vehicle speed sensor 26, and multiplies by a value (such as 3.6) for unit conversion to detect the effective mass.

Note that in order to simplify the explanation, explanation follows regarding a case in which an assessment of a rear-end collision is made using the sensor output value of the contact sensor 28, and the active device 34 at the collision side is actuated. Namely, at step 107E, determination is made whether or not the other vehicle has collided from the rear with the occupant's vehicle by distinguishing whether or not the sensor output value M of the contact sensor 28 has exceeded the threshold value TH, this being whether or not the third threshold value th3 has been exceeded in this case. Processing returns to step 102 in cases in which negative determination was made, and processing transitions to step 107F in cases in which affirmative determination was made at step 107E. At step 107F, the active device 34 at the collision side is actuated, and the present processing routine is ended. The headrest airbag device 39H is employed as an example of the active device 34 actuated at step 107F. Namely, the ECU 12 outputs an actuation signal indicating an instruction to actuate the active device 34 at the collision side. The head of the occupant seated in the vehicle seat 50 is protected during a collision by actuating the active device 34 at the collision side in this manner.

In cases in which there is a possibility of the other vehicle colliding with the occupant's vehicle obliquely from the rear, processing transitions to step 109. At step 109, the active device 34 at the approach side is transitioned to the actuation preparation state. In the present exemplary embodiment, the fourth threshold value th4 is set as the threshold value TH for assessing a collision with another vehicle obliquely from the rear as an example of the actuation preparation state. The threshold value TH for assessing a collision with another vehicle is thereby changed from the third threshold value th3 to the smaller fourth threshold value th4.

At the next step 110, an assessment is made as to whether a collision of the other vehicle with the occupant's vehicle is unavoidable, and at the next step 112, determination is made as to whether or not a collision between the other vehicle at the oblique rear and the occupant's vehicle is unavoidable. In cases in which negative determination was made at step 112, at step 114, the active device 34 is returned to a normal state, and processing returns to step 102. Moreover, the threshold value TH is returned from the fourth threshold value th4 to the third threshold value th3. In cases in which an affirmative determination was made at step 112, the active device 34 is actuated at step 116.

At the next step 119, a collision between the occupant's vehicle and the other vehicle obliquely from the rear is assessed based on the sensor output value of the contact sensor 28. Namely, at step 119, the effective mass of the other vehicle serving as the object is assessed. The effective mass is detected based on the detection result of the contact sensor 28 and the detection result of the vehicle speed sensor 26. Note that at step 119, assessment of the collision side is also executed for the collision of the other vehicle with the occupant's vehicle obliquely from the rear, similarly to step 118 in FIG. 5.

Next, at step 121, determination is made as to whether or not a collision has occurred based on the assessment result at step 119. Namely, at step 121, determination is made as to whether or not the other vehicle has collided with the occupant's vehicle obliquely from the rear by distinguishing whether or not the effective mass M has exceeded the threshold value TH, namely, whether or not the effective mass M has exceeded the fourth threshold value th4 used in a collision at the oblique rear. In cases in which negative determination was made at step 121, at step 122, the actuated active device 34 is returned to the normal state, and processing returns to step 102.

In cases in which affirmative determination was made at step 121, at step 124, an actuation instruction is issued to the active device 34 at the collision side.

Note that although determination is made as to whether or not a collision has occurred using the deformation amount of the vehicle bumper (effective mass) in the present exemplary embodiment, determination of a collision is not limited to only using the deformation amount of the vehicle bumper (effective mass). For example, a collision may be determined to have occurred in cases in which the deformation amount of the vehicle bumper (effective mass) does not reach the fourth threshold value th4, but the occupant's vehicle has rotated exceeding a predetermined rotation angle. Namely, in cases in which the other vehicle has collided obliquely from the rear of the occupant's vehicle, the occupant's vehicle may enter a rotating state due to a difference between the traveling direction of the occupant's vehicle and the collision direction. Namely, a collision may be determined to have occurred in cases in which rotation of the vehicle is detected using the behavior sensor 27, and the vehicle has entered a rotating state.

Next, at step 126, forecasting processing is executed to forecast the risk of a secondary collision. At the next step 128, determination is made as to whether or not there is a risk of a secondary collision, and in cases in which negative determination was made the present processing is simply ended. In cases in which affirmative determination was made at step 128, an actuation instruction is issued to the active device 34 at the opposite-to-collision side at step 130, and the present processing routine is ended.

As explained above, in the present exemplary embodiment, in cases in which it has been detected that another vehicle is approaching the occupant's vehicle obliquely from the rear, the threshold value for detecting a collision between the occupant's vehicle and the other vehicle is changed from the third threshold value th3 for a normal state to the fourth threshold value th4 used to detect oblique collisions from the rear. This enables a collision between the occupant's vehicle and another vehicle (object) to be assessed, even in cases in which the deformation amount (effective mass) of the vehicle bumper is small, as in an oblique collision from the rear.

In the present exemplary embodiment, changing the threshold value set for use in a normal state to a smaller threshold value according to effective mass enables a collision in which another vehicle collides with the occupant's vehicle obliquely from the rear to be detected, thereby enabling a conventionally known collision detection device to double as a device for detecting an oblique collision from the rear.

In the present exemplary embodiment, a case has been explained in which the pressure sensors are provided at the vehicle bumper and an effective mass, computed using the deformation amount of the vehicle bumper, is detected; however, for example, a pressure chamber may be provided at the vehicle bumper and the pressure detected as the deformation amount of the vehicle bumper.

In each of the above exemplary embodiments, processing has been explained that is performed by executing programs indicating the processing flows illustrated in FIG. 5 and FIG. 9; however, the program processing may be implemented by hardware.

Note that in each of the above exemplary embodiments, a case has been explained in which the seatbelt device 36 and the airbag device 38 have been employed as the active devices 34 to protect the occupant of the occupant's vehicle; however, there is no limitation to employing the seatbelt device 36 and the airbag device 38. For example, application may also be made to a device that protects the occupant of the occupant's vehicle by moving at least part of a mechanism such as a door trim. Moreover, the shape of at least one of the vehicle seat 50 or the headrest 56 may be configured capable of changing as the active devices 34, and the occupant of the occupant's vehicle protected by changing the shape.

In each of the above exemplary embodiments, a case has been explained in which an active device provided inside the occupant's vehicle is employed as the active device 34 to protect the occupant of the occupant's vehicle; however, there is no limitation to providing the active device inside the occupant's vehicle. For example, a configuration may be applied in which an active device is provided at the exterior of the occupant's vehicle to soften a collision of an object against the occupant's vehicle, the active device provided at the exterior of the occupant's vehicle being actuated during a collision, and the occupant of the occupant's vehicle protected by softening the collision of the object against the occupant's vehicle.

In each of the above exemplary embodiments, a case has been explained in which an object at the oblique rear of the occupant's vehicle is detected from the sensor output value of the prediction sensor 32, such as an onboard camera or onboard radar; however, there is no limitation to detecting an object using the prediction sensor 32. For example, an automated driving support device that supports automated driving while detecting surrounding conditions of the occupant's vehicle may be employed to detect objects at the oblique rear of the occupant's vehicle.

In each of the above exemplary embodiments, a case has been explained in which the active device 34 that protects the occupant of the occupant's vehicle is actuated in cases in which there is a risk of an oblique collision from the rear in which a collision with another vehicle is unavoidable; however, there is no limitation thereto. For example, a device that avoids or suppresses a collision of object with the occupant's vehicle may be employed to protect the occupant of the occupant's vehicle. Specifically, a guidance device which, in cases in which a collision is inevitable, forecasts the direction in which the occupant's vehicle is heading during the collision, detects the presence or absence of an escape region where the occupant's vehicle can escape in the forecast direction, and when an escape region is present, guides the occupant's vehicle to the escape region, may be employed as the active device. As another specific example, a guidance device which forecasts a vehicle speed capable of avoiding or softening a collision of an object by increasing or decreasing the vehicle speed of the occupant's vehicle while detecting the surrounding conditions of the occupant's vehicle, and guides the occupant's vehicle to a traveling state at the forecast vehicle speed, may be employed as the active device.

In each of the above exemplary embodiments, a case has been explained in which another vehicle is employed as an object; however, there is no limitation to an automobile, and the vehicle may be a light vehicle, a one-wheeled vehicle, a two-wheeled vehicle, a three-wheeled vehicle, or a vehicle with even more wheels.

What is claimed is:

1. A vehicle occupant protection device comprising:
   a rear detection sensor that detects an object approaching obliquely from a rear of an occupant's vehicle;
   circuitry that outputs an actuation signal;
   a seatbelt device that includes a restrainer to, in cases in which the object has been detected by the rear detection sensor, increase restraint force on an occupant by taking up webbing after being input with the actuation signal;
   a physical quantity detection sensor that detects a physical quantity relating to an oblique collision from the rear and outputs a detection value;
   an airbag device that includes an airbag deployed during an oblique collision from the rear to protect an occupant; and
   a controller that controls to actuate the airbag device in cases in which the detection value detected by the physical quantity detection sensor has exceeded a threshold value, the controller employing a first threshold value as the threshold value in cases in which the object is not detected by the rear detection sensor, and employing a second threshold value that is smaller than the first threshold value as the threshold value in cases in which the object has been detected by the rear detection sensor.

2. The vehicle occupant protection device of claim 1, wherein an object for detection by the rear detection sensor is an object approaching obliquely from the rear for which a collision with the occupant's vehicle is unavoidable.

3. The vehicle occupant protection device of claim 1, wherein:
   the airbag device includes a plurality of airbag devices;
   the vehicle occupant protection device further includes a secondary collision forecasting sensor that, after the occupant's vehicle and the object have collided, forecasts a secondary collision with another object that is different from the object; and the controller controls to actuate at least one airbag device out of the plurality of airbag devices in cases in which the detection value has exceeded the threshold value, and controls to protect the occupant from a forecasted secondary collision and to actuate an airbag device that has not yet been actuated in cases in which a secondary collision has been forecast by the secondary collision forecasting sensor.

4. The vehicle occupant protection device of claim 3, wherein the plurality of airbag devices includes at least one airbag device selected from the group consisting of a curtain shield airbag device, a near side airbag device, and a far side airbag device.

5. The vehicle occupant protection device of claim 3, wherein the airbag device that has not yet been actuated is an airbag device disposed opposite to another object, the secondary collision with which is forecasted, with respect to the occupant.

6. The vehicle occupant protection device of claim 1, wherein:

the airbag device includes a plurality of airbag devices; and in cases in which the controller controls to actuate at least one airbag device from out of the plurality of airbag devices, at the same time, or after a predetermined duration has elapsed, the controller also controls to actuate at least one airbag device that has not yet been actuated, from out of the plurality of airbag devices.

7. The vehicle occupant protection device of claim 1, wherein the physical quantity detection sensor includes at least one sensor selected from the group consisting of a G sensor and a yaw rate sensor.

8. The vehicle occupant protection device of claim 1, wherein the controller employs the second threshold value that is smaller than the first threshold value as the threshold value during a predetermined period, in cases in which the object has been detected.

9. The vehicle occupant protection device of claim 8, wherein the controller changes the threshold value to the first threshold value after the predetermined period, in cases in which the second threshold value is employed as the threshold value.

10. The vehicle occupant protection device of claim 1, wherein the controller changes the threshold value to the first threshold value if a distance between the occupant's vehicle and the object exceeds a predetermined distance, in cases in which the object has been detected and the second threshold value is employed as the threshold value.

11. A vehicle occupant protection method comprising:

detecting an object approaching obliquely from a rear of an occupant's vehicle;

increasing restraint force on the occupant in cases in which the object has been detected by taking up webbing of a seatbelt device that includes a restrainer to increase restraint force on the occupant by webbing take-up;

detecting a physical quantity relating to an oblique collision from the rear and outputting a detection value;

deploying an airbag during an oblique collision from the rear to protect an occupant; and controlling the actuation of the airbag in cases in which the detection value has exceeded a threshold value, the controller employing a first threshold value as the threshold value in cases in which the object is not detected by a rear detection sensor, and employing a second threshold value that is smaller than the first threshold value as the threshold value in cases in which the object has been detected by the rear detection sensor.

12. A non-transitory computer readable medium storing a program that causes a computer to execute a process for vehicle occupant protection, the process comprising: detecting an object approaching obliquely from a rear of an occupant's vehicle; increasing restraint force on the occupant in cases in which the object has been detected by taking up webbing of a seatbelt device that includes a restrainer to increase restraint force on the occupant by webbing take-up; detecting a physical quantity relating to an oblique collision from the rear and outputting a detection value: deploying an airbag: during an oblique collision from the rear to protect an occupant; controlling the actuation of the airbag in cases in which the detection value has exceeded a threshold value, the controller employing a first threshold value as the threshold value in cases in which the object is not detected by a rear detection sensor, and employing a second threshold value that is smaller than the first threshold value as the threshold value in cases in which the object has been detected by the rear detection sensor.

\* \* \* \* \*